(12) United States Patent
Zhai et al.

(10) Patent No.: US 10,316,217 B2
(45) Date of Patent: Jun. 11, 2019

(54) DUST AND MOISTURE RESISTANT COATING COMPOSITIONS, METHODS AND RELATED COATED ARTICLES

(71) Applicant: UNIVERSITY OF CENTRAL FLORIDA RESEARCH FOUNDATION, INC., Orlando, FL (US)

(72) Inventors: Lei Zhai, Oviedo, FL (US); Astha Malhotra, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 15/309,856

(22) PCT Filed: May 7, 2015

(86) PCT No.: PCT/US2015/029583
§ 371 (c)(1),
(2) Date: Nov. 9, 2016

(87) PCT Pub. No.: WO2015/171844
PCT Pub. Date: Nov. 12, 2015

(65) Prior Publication Data
US 2017/0233607 A1    Aug. 17, 2017

Related U.S. Application Data

(60) Provisional application No. 61/991,111, filed on May 9, 2014.

(51) Int. Cl.
| C09D 185/00 | (2006.01) |
| C08G 79/00 | (2006.01) |
| C09D 183/08 | (2006.01) |
| C08G 77/24 | (2006.01) |
| C08G 77/18 | (2006.01) |
| C08G 77/14 | (2006.01) |

(52) U.S. Cl.
CPC ........... C09D 185/00 (2013.01); C08G 77/18 (2013.01); C08G 77/24 (2013.01); C08G 79/00 (2013.01); C09D 183/08 (2013.01); C08G 77/14 (2013.01)

(58) Field of Classification Search
USPC ....................... 106/287.12–287.16
See application file for complete search history.

(56) References Cited

U.S. PATENT DOCUMENTS

| 5,498,475 | A * | 3/1996 | Takigawa ................. B05D 7/02 428/334 |
| 7,993,707 | B2 * | 8/2011 | Nun ...................... C09D 183/04 427/384 |
| 2003/0195283 | A1 * | 10/2003 | Lee ..................... G03G 5/14708 524/261 |
| 2005/0277755 | A1 * | 12/2005 | Hamada .................. C08L 83/06 528/32 |
| 2007/0243394 | A1 | 10/2007 | Yamaya et al. |
| 2009/0238601 | A1 * | 9/2009 | Kuroda .............. G03G 15/0233 399/111 |
| 2011/0141194 | A1 * | 6/2011 | Imai ..................... C09D 11/101 347/45 |

FOREIGN PATENT DOCUMENTS

| DE | 19547088 A1 | 9/1996 |
| EP | 1178071 A2 | 2/2002 |
| JP | 2010106076 A | 5/2010 |

OTHER PUBLICATIONS

"The Hydrolysis/Condensation Behavior of Methacryloyloxyfunctional Alkoxysilanes: Structure-Reactivity Relations" authored by Altmann et al. and published in Monatshefte fur Chemie (2003) 134, 1081-1092.*

Kong, D.Y., et al; Sol-gel Synthesis and Characterization of $Zn_2SiO_4:Mn@SiO_2$ Spherical Core-Shell Particles; Journal of the Electrochemical Society; 152 (9); pp. H146-H151; 2005 copyright The Electrochemical Society, Inc.

International Search Report and Written Opinion Form PCT/ISA/210, International Application No. PCT/US2015/029583, p. 1-13, International Filing Date May 7, 2015, Search Report dated Jul. 15, 2015.

* cited by examiner

*Primary Examiner* — Marc S Zimmer
(74) *Attorney, Agent, or Firm* — Bond Schoeneck & King, PLLC; George McGuire

(57) ABSTRACT

A dust resistant and moisture resistant coating composition includes within a solvent that is generally an aqueous solvent: (1) a first component that is chemically condensable with itself and independently cross-linkable; (2) a second component that is chemically condensable with itself and with the first component and includes at least one of a fluorocarbon functionality and a hydrocarbon functionality; and (3) an optional third component that is chemically condensable with the first component and the second component but is neither independently cross-linkable nor includes the at least one of the fluorocarbon functionality and the hydrocarbon functionality. A coated article that results from application of the coating composition to a substrate shows enhanced dust resistance and moisture resistance.

13 Claims, 1 Drawing Sheet

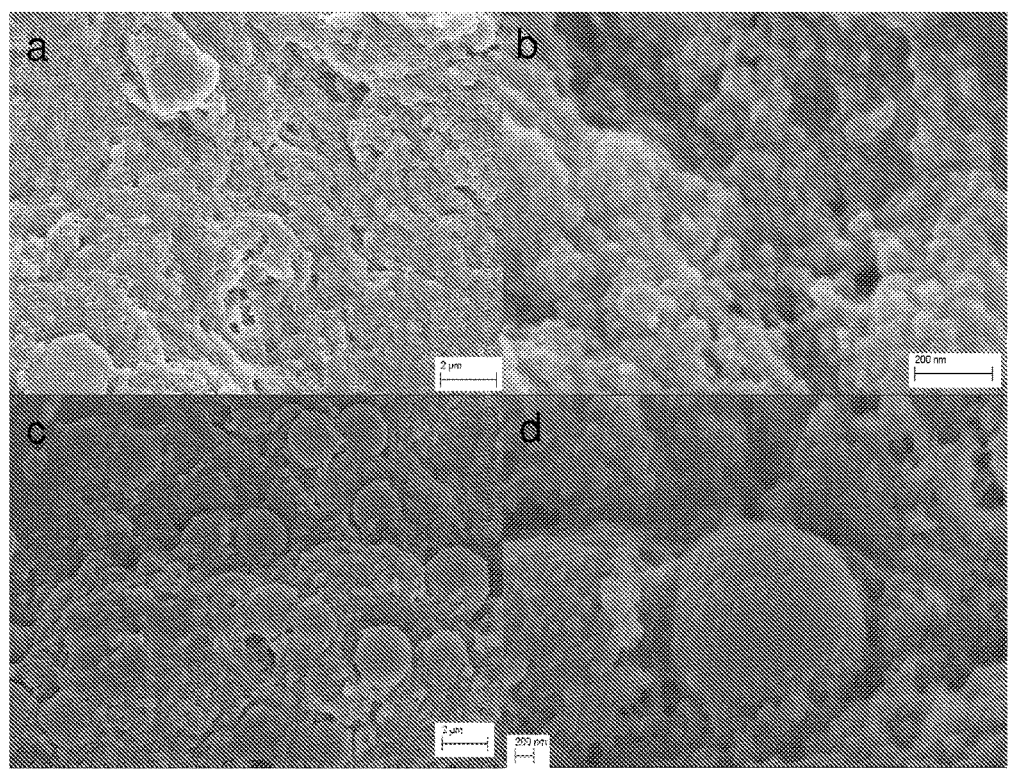

DUST AND MOISTURE RESISTANT COATING COMPOSITIONS, METHODS AND RELATED COATED ARTICLES

CROSS-REFERENCE TO RELATED APPLICATION

This application is related to, and derives priority from, U.S. Provisional Patent Application Ser. No. 61/991,111, titled Moisture/Dust Resistant Coating, Method and Article, filed 9 May 2014, the contents of which is incorporated herein fully by reference.

BACKGROUND

Field

Embodiments relate generally to dust resistant and moisture resistant coating compositions, related methods and related coated articles. More particularly embodiments relate to dust resistant and moisture resistant coating compositions, related methods and related coated articles with enhanced performance.

Description of the Related Art

Dust resistant and moisture resistant coating compositions and related coated articles are generally recognized as desirable within many applications, including in particular air handling applications, insofar as dust resistant and moisture resistant coated mechanical components provide value within the context of reduced energy consumption incident to aerodynamic drag reduction when operating, in particular, a residential, a commercial or an industrial air handling system.

Since dust resistant and moisture resistant coatings have many applications in addition to air handling system applications, desirable at minimum are additional dust resistant and moisture resistant coating compositions and related dust resistant and moisture resistant coated articles, with enhanced performance.

SUMMARY

Embodiments include as a dust resistant coating composition a super-hydrophobic coating composition. Embodiments also include a related method for preparing the super-hydrophobic coating composition and a related article coated with the super-hydrophobic coating composition. Within each of the super-hydrophobic coating composition, the method for preparing the super-hydrophobic coating composition and the article coated with the super-hydrophobic coating composition, the super-hydrophobic coating composition comprises: (1) a solvent which is typically and preferably an aqueous solvent; (2) a first component that is chemically condensable with itself, and also independently cross-linkable; (3) a second component that is chemically condensable with itself and with the first component, and also includes at least one of a fluorocarbon functionality and a hydrocarbon functionality; and (3) an optional third component that is chemically condensable with itself, the second component and the first component, but is neither independently cross-linkable nor includes the at least one of the fluorocarbon functionality and the hydrocarbon functionality.

A specific example embodiment in accordance with multiple embodiments that are otherwise contemplated in accordance with the embodiments comprises an aqueous coating composition of at least partial hydrolysis products of: (1) 3-glycidoxypropyl-trimethoxysilane (GPTMS) (or an alternative glycidoxyalkyl-trialkoxysilane (or -trihalosilane (i.e., generally a tri-substituted silane))) as a first component; (2) (a) perfluoroctyl-trichlorosilane (TCFS) (or an alternative perfluoroalkyl-trihalosilane (or -trialkoxysilane (i.e., generally a tri-substituted silane); or (b) an alkyl-trihalosilane (or -trialkoxysilane (i.e., generally a tri-substituted silane))) as a second component; and (3) cerium nitrate (or an alternative cerium salt) as a third component.

The foregoing characteristics of the first component, the second component and the third component, in conjunction with an order of mixing of the foregoing three components, provides an opportunity for independent tuning of desirable properties of a coated article in accordance with the embodiments while using the coating composition in accordance with the embodiments. Such desirable properties that may be tuned include, but are not limited to: (1) adhesion of a cured coating composition to a substrate; (2) durability of the cured coating composition upon the substrate; and (3) hydrophobic character of the cured coating composition upon the substrate.

The embodiments contemplate with respect to the first component, the second component and the third component at least a partial hydrolysis reaction, followed by at least a partial condensation reaction when forming a cured coating composition upon a substrate. As a result of ordering of coating composition formulation, a cured coating composition will have a comparatively fluorocarbon rich surface upon a base material that may comprise either the condensed first component, or the condensed first component and the condensed third component.

Within the embodiments as described and the invention as claimed the terminology "super-hydrophobic" is intended as meaning a coating composition that leads to a coated article having a water droplet contact angle greater than about 150 degrees, and more preferably greater than about 160 degrees with an advancing and receding hysteresis less than about 10 degrees.

Within the embodiments as described and the invention as claimed the terminology "chemically condensable" is intended as meaning a component of a coating composition that possesses a hydrolysable labile moiety that leads to formation of an oxide type structure. Within the context of the first exemplary component, the oxide type structure provides a poly(glycidoxypropyl)-polysiloxane type material. Within the context of the second exemplary component, the oxide type structure provides a poly(perfluoroctyl-siloxane) (or poly(perfluoroalkyl-siloxane), or poly(alkyl-siloxane) type material. Within the context of the third exemplary component cerium salt, hydrolysis and condensation provides a ceria type material.

Within the embodiments as described and the invention as claimed the terminology "independently cross-linkable" is intended as meaning a component of a coating composition that possesses a moiety other than a hydrolysable labile moiety that leads to formation of a cross-linked organic polymer type structure.

Within the embodiments as described and the invention as claimed the terminology "at least one of a fluorocarbon functionality and a hydrocarbon functionality" is intended as including anywhere from a pure hydrocarbon chain, to a partial fluorination of an otherwise hydrocarbon pendent side chain to a complete fluorination of a pendent side chain within a condensable second component.

Within the embodiments as described and the invention as claimed the terminology "over" with respect to at least two layers or structures is intended as meaning at least a partial horizontal overlap of the at least two layers or structures, without necessarily contact of the at least two layers or structures. In contrast, use of the terminology "upon" with respect to at least two layers or structures is intended as meaning the same at least partial horizontal overlap of the at least two layers or structures, but with necessary contact of the at least two layers or structures.

A particular coating composition in accordance with the embodiments includes a solvent. The particular coating composition also includes a first at least partially hydrolyzed component that is condensable with itself, and independently cross-linkable. The particular coating composition also includes a second at least partially hydrolyzed component that is condensable with itself and the first at least partially hydrolyzed component, and includes at least one of a fluorocarbon functionality and a hydrocarbon functionality.

Another particular coating composition in accordance with the embodiments includes a solvent composition including at least a partial glycidoxyalkyl-trisubstituted-silane hydrolysis product and at least one of at least a partial perfluoroalkyl-trisubstituted-silane and at least a partial alkyl-trisubstituted silane hydrolysis product.

A particular method for preparing a coating composition in accordance with the embodiments includes at least partially hydrolyzing within a solvent a first component that is condensable with itself, and independently cross-linkable. The method also includes then at least partially hydrolyzing within the solvent a second component that is condensable with itself and the first component, and at includes at least one of a fluorocarbon functionality and a hydrocarbon functionality.

Another particular method for preparing a coating composition in accordance with the embodiments includes hydrolyzing in a solvent a glycidoxyalkyl-trisubstituted-silane material to form a hydrolyzed glycidoxyalkyl-trisubstituted-silane material composition. The method also includes adding to the hydrolyzed glycidoxyalkyl-trisubstituted-silane material at least one of a perfluoroalkyl-trisubstituted-silane material and an alkyl-trisubstituted silane material and hydrolyzing the at least one of the perfluoroalkyl-trisubstituted-silane and the alkyl-trisubstituted silane) material to form a hydrolyzed glycidoxylalkyl-trisubstituted-silane and at least one of the perfluoroalky-trisubstituted-silane and the alkyl-trisubstituted silane material composition.

A particular coated article in accordance with the embodiments includes a substrate surface and a cured coating located upon the substrate surface. The cured coating composition includes a cured first component that is condensable with itself, and independently cross-linkable. The cured coating composition also includes a cured second component that is condensable with itself and the first component, and includes at least one of a fluorocarbon functionality and a hydrocarbon functionality.

Another particular coated article in accordance with the embodiments includes a substrate surface and a cured coating applied to the substrate surface. The cured coating includes a cured hydrolysis product of a glycidoxyalkyl-trisubstituted-silane and at least one of a perfluoroalky-trisubstituted-silane and an alkyl-trisubstituted-silane.

BRIEF DESCRIPTION OF THE DRAWINGS

The objects, features and advantages of the embodiments are understood within the context of the Detailed Description of the Non-Limiting Embodiments, as set forth below. The Detailed Description of the Non-Limiting Embodiments is understood within the context of the sole accompanying drawing, which forms a material part of this disclosure, wherein:

FIG. 1 shows a series of scanning electron microscopy images of a coated article (i.e., a glass plate) coated with a cured coating composition in accordance with the embodiments.

DETAILED DESCRIPTION OF THE NON-LIMITING EMBODIMENTS

Embodiments provide a coating composition, a method for preparing the coating composition and an article that is coated with the coating composition, where the coating composition, the method and the article provide dust resistance and moisture resistance due to the presence of the cured coating composition upon a substrate which comprises the coated article. A coating composition in accordance with the embodiments includes within a base solvent: (1) a first component comprising a material that is condensable with itself and also independently cross-linkable; (2) a second component comprising a material that is condensable with itself and the first material, and also includes at least one of a fluorocarbon functionality and a hydrocarbon functionality; and (3) an optional third component comprising a material that is condensable with itself, the second component and the first component, but is neither independently cross-linkable nor includes the at least one of the fluorocarbon functionality and the hydrocarbon functionality.

1. The Coating Composition

Although the experimental data which follows illustrates the embodiments within the context of an aqueous solvent based coating composition that comprises an alkaline aqueous solution of: (1) glycidoxypropyl-trimethoxysilane; in conjunction with (2) perfluorooctyl-trichlorosilane (or alternatively an alkyl-trisubstituted silane); further in conjunction with (3) cerium nitrate, the embodiments are not intended to be so limited.

Rather in a more general sense, a coating composition in accordance with the embodiments includes, in addition to a solvent which preferably comprises or consists essentially of an acidic or alkaline aqueous solvent, as described above: (1) a first component that is condensable with itself and independently cross-linkable; and (2) a second component that is condensable with itself and the first component, and also includes at least one of a fluorocarbon functionality and a hydrocarbon functionality; and (3) optionally a third component that is condensable with itself and also with the second component and the first component, and is neither independently cross-linkable nor includes the at least one of the fluorocarbon functionality and the hydrocarbon functionality.

Within these general embodiments the first component comprises a hydrolysable oxide forming chemically condensable material that further includes an independent cross-linkable functionality selected from the group including but not limited to epoxy functionality and vinyl functionality. Within these general embodiments the second component also includes a hydrolysable metal oxide forming chemically condensable material that further includes at least one of a fluorocarbon functionality and a hydrocarbon functionality. Within these general embodiments the at least one of the fluorocarbon functionality and the hydrocarbon functionality may include, but is not necessarily limited to alkyl, alkenyl or aromatic at least partially fluorinated functionality selected from the group including but not limited to straight chain at least partially fluorinated materials, branched chain at least partially fluorinated materials and aromatic at least partially fluorinated materials having up to at least about 18 carbon atoms. Finally, within these general embodiments the third component typically comprises a chemically condensable material consistent with and condensable with the chemically condensable material of the first component and the chemically condensable material of the second component, but having neither any cross-linkable functionality nor any fluorocarbon functionality or hydrocarbon functionality.

Within each of the foregoing materials the metal oxide forming condensable material may provide a substituted metal oxide selected from the group including but not limited to substituted silica, titania, zirconia, hafnia and ceria metal oxides. Typically and preferably, the first component comprises a silica chemical condensable functionality within the context of a hydrolysable silicon trialkoxide, the second component also comprises a silica chemical condensable functionality but within the context of s hydrolysable silicon trihalide and the third component comprises a chemical condensable functionality within the context of a cerium tetra-halide based chemically condensable functionality. Such a chemical condensable functionality may generally comprise, but is not limited to a halide functionality (i.e., such as but not limited to a fluoride, a chloride, a bromide or an iodide functionality) as above within the first component and the second component. Such a chemical condensable functionality may also comprise, but is not necessarily limited to an alkoxide functionality (i.e., such as but not limited to a methoxide, an ethoxide, a higher straight chain alkoxide, a branched chain alkoxide) as above within the first component and the second component.

Within the context of the embodiments, the coating composition comprises a solvent, and in particular desirably an aqueous solvent that may be either acidic or alkaline, although other solvents are not excluded for a coating composition in accordance with the embodiments.

Such other solvents may include, but are not necessarily limited to, alcohols. Within the embodiments, and relative to 100 volume parts of the solvent: (1) the first component is present at about 1.0 to about 10.0 volume parts; (2) the second component is present at about 1.0 to about 10.0 volume parts; and (3) the optional third component is present at about 0.5 to about 5.0 volume parts. The embodiments also contemplate a concentrated 28 percent aqueous ammonia alkali catalyst at about 1.0 to about 10.0 volume parts, or alternatively a mineral acid catalyst, such as but not limited to hydrochloric acid at about 1.0 to about 10.0 volume parts. For ceria particle formation from about 2 to about 10 percent weight parts cerium nitrate may also be added.

A coating composition in accordance with the embodiments may be prepared using any of several mixing methods as are otherwise generally conventional in the art. Such mixing methods may include, but are not limited to ultrasonic assisted mixing methods, thermally assisted mixing methods and conventional mechanically assisted mixing methods. Within the embodiments, mixing may be undertaken at an elevated temperature and also may be undertaken using mixing assistive devices in conjunction with elevated temperature from about 50 to about 70 degrees centigrade. For enhanced performance the embodiments also contemplate a multi-temperature and multi-time thermal curing that also includes a second higher elevated temperature for a time period, including from about 50 to about 100 degrees centigrade for about 30 to about 300 minutes.

Within the context of the embodiments, the coating composition may be coated onto any of several types of substrates (i.e., which comprise an article in accordance with the embodiments), such substrates comprising a material (or materials) selected from the group including but not limited to conductor materials, semiconductor materials and dielectric materials, metal materials, ceramic materials, plastic materials, composite materials, wood materials, hard surfaced materials and fibrous materials.

Within the context of the embodiments, the coating composition may be coated using any of several methods including but not limited to dip coating methods, spray coating methods, roll coating methods and any other conventional and non-conventional methods. Typically and preferably the coating composition is coated upon a substrate to a thickness from about 5 to about 50 micrometers and subsequently heat treated at a temperature from about 50 to about 70 degrees centigrade for a time period from about 30 to about 300 minutes.

The embodiments also contemplate a longer term cure at room temperature or ambient temperature about 20 to about 35 degrees centigrade for about 120 to about 180 hours at a relative humidity from about 30 to about 80 percent. Such a longer term curing capability, or cured state that may be achieved under longer term cure conditions, may be determined by measurement of contact angle as noted above. This longer term curing capability for a coating composition in accordance with the embodiments is particularly desirable under circumstances where a coating composition in accordance with the embodiments is utilized within the context of an outdoor structure or another outdoor application.

2. Experimental Example

As a general consideration, dust accumulation and water accumulation on surfaces of decks, pillars, mechanical fans, cooling coils, blinds and other surfaces causes many problems including reduced performance and life time, and increased maintenance cost.

To address the foregoing problems, an exemplary coating material is a water-based nanoparticle suspension that forms a very hydrophobic coating on substrates with low surface energy, thus providing resistance to dust and moisture. Such a coating composition in accordance with the embodiments is specifically designed for in-field application.

Such a coating composition includes features including but not limited to:

Designed for dry/humid, dusty environments
Water based
Ambient temperature application
Formulated to bond to steels, glasses, plastics surfaces Such a coating composition includes physical properties including but not limited to:

Percent Solids: 1.5%
pH: 9-10
Shelf Life: 6 months from date of manufacture
Coverage Rate: 20 m$^2$/L
Product Lifetime: Up to 3 years in arid environments*

* Based on accelerated weathering data.

3. Storage Conditions

Protect from freezing. Best storage temperature is 60-80° F. (15-27° C.). Higher temperature reduces normal storage life. Rotate stock on a "first in, first out" basis.

Shelf Life

When stored at the recommended temperature in the original, unopened container, these products have a shelf life of 3 months from the date of manufacture. Do not use if liquid appears to have thickened or formed a gel, or if solids are visually present in the container, especially at the bottom of the container. To be usable, a coating composition in accordance with the embodiments should be a clear and transparent solution.

4. Application Notes

Product is designed for application to a clean substrate. Applications to surfaces with dust and
loose coatings may affect product performance and lifetime.

Product is designed for application to substrates with a treatment at 160° F. (70° C.).
Performance
of the product can be significantly reduced when applied to surfaces that are not stable at this temperature.
A. Spray or roller coat the coating material on substrates
B. Remove excess coating
C. Air dry the coating
D. Treat the coated sample at 160° F. (70° C.) for 30 minutes Wait 30 seconds after the coating is applied to squeegee off the excess coating.

Work from top edge to bottom edge, left to right (same as roller application).

Squeegee off the excess coating before it dries. If needed, excess coating can be captured in a
drain pan.

If necessary, wipe off any drops along the edges or streaks on the face with a clean cotton cloth.

Required Equipment

Two gallon or larger plastic hand-held sprayer, for water only
Lint-free cleaning cloths (e.g., Texwipe® Wiper)
Cotton cleaning cloths
Flat razor blades with holder
Squeegee (e.g., Sorbo® Squeegee 3×4½)
Paint roller 5. Formulation Detail An experimental formulation in accordance with the embodiments was synthesized in water ($H_2O$) using ammonium hydroxide ($NH_4OH$) for hydrolyzing 3-glycidoxypropyl-trimethoxysilane (GPTMS) particle synthesis and as binder and 1H,1H,2H,2H,-perfluorocotyl-trichlorosilane (TCFS).

For a 100 mL formulation, the composition is as follows:
DI $H_2O$: 100 mL
$NH_4OH$: 2.5 mL
GPTMS: 1.5 mL
TCFS: 750 µL The synthesis is a two-step procedure. In the first step, 1.5 mL of GPTMS is added to a premixed 2.5 mL of $NH_4OH$ in 100 ml of $H_2O$ while continuously stirring at 800-1000 rpm. The solution is left to stir for at least 12 hrs. The solution would turn milky white. In the second step, 750 µL TCFS is added to the above solution while stirring for at least 30 minutes. Ceria particles can be incorporated in the coating solutions by adding 5 mmol cerium nitrate in the first step.

6. Analytical Data

FIG. 1 shows SEM images of super-hydrophobic coatings on glass substrates in accordance with the foregoing coating composition and curing conditions. a) and b) coatings without embedded ceria nanoparticles. c) and d) coatings with embedded ceria nanoparticles. It is noted that the embedded ceria nanoparticles are embedded in a coating material that itself has an apparently granular topography, but absent nanoparticles.

All references, including publications, patent applications, and patents cited herein are hereby incorporated by reference in their entireties to the same extent as if each reference was individually and specifically indicated to be incorporated by reference and were set forth in its entirety herein.

The use of the terms "a" and "an" and "the" and similar referents in the context of describing the embodiment (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments and does not impose a limitation on the scope of the embodiment unless otherwise claimed.

No language in the specification should be construed as indicating any non-claimed element as essential to the practice of the embodiment.

It will be apparent to those skilled in the art that various modifications and variations can be made to the present embodiments without departing from the spirit and scope of the embodiment. There is no intention to limit the embodiments to the specific form or forms disclosed, but on the contrary, the intention is to cover all modifications, alternative constructions, and equivalents falling within the spirit and scope of the embodiments, as defined in the appended claims. Thus, it is intended that the present embodiments cover the modifications and variations of the embodiments provided they come within the scope of the appended claims and their equivalents.

What is claimed is:

1. A coating composition comprising:
an aqueous solvent;
a first at least partially hydrolyzed chemical component that is condensable with itself, and independently cross-linkable;
a second at least partially hydrolyzed chemical component that is condensable with itself and the first at least partially hydrolyzed chemical component, and includes at least one of a fluorocarbon functionality and a hydrocarbon functionality; and
an additional at least partially hydrolyzed chemical component derived from a ceria precursor material.

2. The coating composition of claim 1 wherein the coating composition is optically clear in the visible range.

3. The coating composition of claim 1 further comprising a third at least partially hydrolyzed chemical component that is condensable with itself, the first at least partially hydrolyzed chemical component and the second at least partially hydrolyzed chemical component, and is neither independently cross-linkable nor includes the at least one of the fluorocarbon functionality and the hydrocarbon functionality.

4. The coating composition of claim 3 wherein the coating composition is optically clear in the visible wavelength range.

5. A coating composition comprising an aqueous composition comprising:
   a glycidoxyalkyl-tri-substituted silane hydrolysis product;
   at least one of a perfluoroalkyl-tri-substituted silane hydrolysis product and an alkyl-tri-substituted silane hydrolysis product; and
   a ceria precursor material hydrolysis product.

6. The coating composition of claim 5 wherein the aqueous composition is an alkaline aqueous composition.

7. A method for preparing a coating composition comprising:
   at least partially hydrolyzing within a solvent a first chemical component that is condensable with itself, and independently cross-linkable;
   at least partially hydrolyzing within the solvent a second chemical component that is condensable with itself and the first chemical component, and includes at least one of a fluorocarbon functionality and a hydrocarbon functionality; and
   at least partially hydrolyzing within the solvent a ceria precursor component.

8. The method of claim 7 wherein the solvent comprises an aqueous solvent.

9. The method of claim 7 further comprising at least partially hydrolyzing within the solvent a third chemical component that is condensable with itself, the first component and the second component, and is neither independently cross-linkable nor includes the at least one of the fluorocarbon functionality and the hydrocarbon functionality, interposed between the at least partially hydrolyzing the first chemical component and the at least partially hydrolyzing the second chemical component.

10. A method for preparing a coating composition comprising:
    hydrolyzing in a solvent a glycidoxyalkyl-tri-substituted silane material to form a hydrolyzed glycidoxyalkyl-tri-substituted silane material composition;
    adding to the hydrolyzed glycidoxyalkyl-tri-substituted silane material at least one of a perfluoroalkyl-tri-substituted silane and an alkyl-tri-substituted silane material and hydrolyzing the at least one of the perfluoroalkyl-tri-substituted silane material and the alkyl-tri-substituted silane material to form a hydrolyzed glycidoxylalkyl-tri-substituted silane and at least one of the perfluoroalky-tri-substituted silane and the alkyl-tri-substituted silane material composition; and
    adding to the glcidoxyalkyl-tri-substituted silane material prior to adding the perfluoroalkyl-tri-substituted silane material a ceria precursor material and hydrolyzing the ceria precursor material to provide a hydrolyzed ceria precursor material.

11. An article comprising a substrate surface and a cured coating located upon the substrate surface, the cured coating being derived from an uncured coating composition comprising:
    a first component that is condensable with itself, and independently cross-linkable;
    a second component that is condensable with itself and the first component, and includes at least one of a fluorocarbon functionality and a hydrocarbon functionality; and
    a ceria precursor component that is condensable with itself, the first component and the second component.

12. The article of claim 11 further comprising a cured third component that is condensable with itself, the first component and the second component, and neither independently cross-linkable nor at least partially fluorinated.

13. An article comprising a substrate surface and a cured coating located upon the substrate surface, the cured coating being derived from an uncured aqueous composition comprising hydrolysis products of:
    a glycidoxyalkyl-tri-substituted silane;
    at least one of a perfluoroalky-tri-substituted silane and an alkyl-tri-substituted silane; and
    a ceria precursor material.

* * * * *